(12) United States Patent
Vetere, II (10) Patent No.: US 10,889,218 B2
(45) Date of Patent: Jan. 12, 2021

(54) AUTOMATIC STOWING ARMREST FOR A REVERSIBLE SEAT

(71) Applicant: Magna Seating Inc

(72) Inventor: Louis Vetere, II, Commerce Township, MI (US)

(73) Assignee: Magna Seating Inc, Ontario (CA)

( * ) Notice: Subject to any disclaimer, the term of this patent is extended or adjusted under 35 U.S.C. 154(b) by 118 days.

(21) Appl. No.: 16/355,205

(22) Filed: Mar. 15, 2019

(65) Prior Publication Data
US 2019/0283640 A1 Sep. 19, 2019

Related U.S. Application Data

(60) Provisional application No. 62/643,404, filed on Mar. 15, 2018.

(51) Int. Cl.
*B60N 2/75* (2018.01)
*B60N 2/20* (2006.01)

(52) U.S. Cl.
CPC .......... *B60N 2/767* (2018.02); *B60N 2/203* (2013.01); *B60N 2/753* (2018.02)

(58) Field of Classification Search
CPC ........ B60N 2/203; B60N 2/753; B60N 2/767; A47C 7/543
USPC ...................... 297/94, 411.32, 411.38, 283.3
See application file for complete search history.

(56) References Cited

U.S. PATENT DOCUMENTS

| | | | | |
|---|---|---|---|---|
| 2,545,608 A | * | 3/1951 | Edwards | B60N 2/203 297/104 |
| 3,807,799 A | * | 4/1974 | Freedman | B60N 2/767 297/411.32 |
| 6,916,068 B2 | | 7/2005 | Kitamura et al. | |
| 7,125,076 B2 | * | 10/2006 | Beranek | B60N 2/203 297/283.3 |
| 7,281,761 B2 | * | 10/2007 | Brown | B60N 2/06 297/95 |
| 9,758,074 B1 | | 9/2017 | Lin et al. | |
| 2007/0126270 A1 | * | 6/2007 | Saint-Jalmes | B60N 2/0224 297/283.3 |
| 2015/0076874 A1 | * | 3/2015 | Neese | B63B 17/00 297/188.08 |

FOREIGN PATENT DOCUMENTS

| | | |
|---|---|---|
| CN | 103318058 | 3/2013 |
| CN | 107521388 | 8/2017 |
| JP | 2008161500 | 12/2006 |
| WO | 2008007678 | 1/2008 |

* cited by examiner

*Primary Examiner* — Milton Nelson, Jr.
(74) *Attorney, Agent, or Firm* — Miller Canfield (57) ABSTRACT

An improved armrest is provided for a reversible seat that is movable between a forward-facing position and a rearward-facing position. The armrest is rotatably mounted to the seat assembly so as to be rotatable downwardly to a fully deployed position or upwardly to a neutral, stowed position. The armrest may project forwardly in a first deployed position or rearwardly in a second deployed position depending upon whether the seat is in the forward-facing or rearward-facing positions. The seat is reversible from the forward-facing position to the rearward-facing position, or vice versa, wherein the armrest automatically returns to the neutral, stowed position as the seat is moved between these positions.

20 Claims, 9 Drawing Sheets

AUTOMATIC STOWING ARMREST FOR A REVERSIBLE SEAT

CROSS-REFERENCE TO RELATED APPLICATIONS

This application claims priority to U.S. provisional patent application No. 62/643,404, filed Mar. 15, 2018, the disclosure of which is incorporated herein by reference.

FIELD OF THE INVENTION

The invention relates to a reversible seat with an improved armrest and more particularly, to a reversible seat for a vehicle having an armrest which is automatically stowable from a deployed position to a stowed position during reversing movement of the seat between forward-facing and rearward-facing positions.

BACKGROUND OF THE INVENTION

It is known in the art to provide reversible seats or seat assemblies for use in various vehicles such as automobiles. For example, U.S. Pat. No. 7,644,982, which is incorporated herein by reference, discloses a seat assembly that allows a user to position the seat cushion and seat back between two seat positions, namely a forward-facing position and a rearward-facing position. This known seat assembly includes control linkages for positioning the seat back between the forward-facing and rearward-facing positions wherein the angle of the seat cushion changes inclination during movement of the seatback between these two facing positions. It also is known to include an armrest on the seat which is pivotable between forward and rearward positions for use by the occupant.

SUMMARY OF THE INVENTION

It is an object to provide a reversible seat which allows an armrest to move with the seat back and automatically return to a stowed position as the seat back moves through a neutral, upright position in between the forward-facing and rearward-facing positions.

More particularly, the invention relates to an improved armrest for a reversible seat or seat assembly which is movable between a forward-facing position and a rearward-facing position so that an occupant can sit and face in either direction. Preferably, the armrest is rotatable and is mounted to the seat back so as to be rotatable downwardly to a fully deployed position, and rotatable upwardly to a neutral, stowed position as the seat back moves between the forward-facing and rearward-facing positions.

In use, the armrest may project forwardly in a first deployed position or rearwardly in a second deployed position depending upon whether the seat is in the forward-facing or rearward-facing position. The armrest may be deployed to either of these fully deployed positions by manual pivoting of the armrest downwardly away from the stowed position by the occupant. As noted above, the seat is reversible, for example, from the forward-facing position to the rearward-facing position, or vice versa, wherein the inventive armrest automatically returns to the neutral, stowed position when the seat is reversed. The invention therefore relates to an improved pivot mechanism for rotatably supporting the armrest and governing the automatic return of the armrest to the stowed position upon reversing movement of the seat.

In more detail, the armrest is rotatably coupled to a base bracket located within the reversible seat wherein the armrest is supported by and moves with the seat back and is rotatable about a pivot axis. A lock assembly is provided to lock the armrest in either of the forwardly or rearwardly deployed positions, wherein the lock assembly includes a spring loaded lock pin originating from the armrest structure, which extends into and is forced against a travel slot within the base bracket. In the neutral, stowed position, the lock pin is held in place by the opposing forces of a coiled return spring and a rotating arbor plate, which act on opposite sides of the lock pin and are both balanced against a fixed arrester tab on a spring base bracket. The return spring and arbor plate normally bias the armrest toward the neutral, stowed position, wherein the armrest extends lengthwise along the side edge of the seat back. However, the lock pin is carried by the armrest and travels or slides along the travel slot during armrest rotation, wherein the lock pin is biased transversely against one slot edge to allow manual rotation of the armrest between the forwardly and rearwardly deployed positions.

The lock pin is lockable at opposite ends of the travel slot to hold the armrest in a deployed position, and the lock assembly further includes a lock release mechanism to automatically permit return of the armrest to the stowed position. Preferably, the travel slot includes detents at opposite slot ends, wherein the lock pin is biased into one detent or the other to lock the armrest in position, wherein the lock release mechanism can be actuated to push the lock pin out of the detent to unlock the armrest and permit rotation thereof.

More particularly, when the seat is moved to the forward-facing position and the armrest is manually deployed, the lock pin contacts the rotating arbor and moves in a first direction along the travel slot, wherein the rotating arbor engages with the return spring to wind the return spring from the inside. An outer arm of the return spring is held against the fixed arrester tab of the spring base bracket and an inner arm of the return spring is held against the rotating arbor, which allows the spring to be wound from the inside upon the lock pin's contact with the rotating arbor. The arbor plate thereby exerts an arbor force biasing the lock pin and connected armrest back toward the neutral, stowed position of the armrest. At the fully deployed position, the lock pin is forced into one detent in the base bracket travel slot to prevent the armrest from returning to the stowed position and thereby lock the armrest in the forwardly deployed position.

To automatically return the armrest to the neutral, stowed position, an actuation release handle or strap of a lock release mechanism is pulled, causing the downward stroke of two cables coupled to a pair of lock release links located on the base bracket. The downward stroke of the cables rotates the lock release links at a link pivot containing a return spring, which forces the lock pin from the detent. The force of the rotating arbor, motivated by the uncoiling return spring, pushes the lock pin back along the travel slot to the neutral position against the fixed arrester tab which thereby biases the armrest to the stowed position automatically upon displacement of the seat.

A similar lock release mechanism is utilized when the seat is in the rearward-facing position and the armrest is manually deployed. However, the lock pin instead contacts the outer arm of the return spring (instead of the rotating arbor plate), which winds the return spring and exerts a return force rotatably biasing the armrest back toward the armrest's neutral, stowed position. The armrest is again held in the fully deployed position by another detent in the base bracket travel slot which is engaged by the lock pin when in the deployed position. And similarly, when the actuation release handle or strap is pulled, the lock pin is forced out of the second detent by the lock release links. The lock pin is then pushed back to the neutral position against the fixed arrester tab by the uncoiling or unwinding of the return spring which biases and automatically rotates the armrest back to the neutral position. With this configuration, an improved armrest is provided which allows the armrest to be manually moved to a deployed position and automatically returned to the stowed position upon release of the lock mechanism.

Other objects and purposes of the invention, and variations thereof, will be apparent upon reading the following specification and inspecting the accompanying drawings.

BRIEF DESCRIPTION OF THE DRAWINGS

Advantages of the present invention will be readily appreciated as the same becomes better understood by reference to the following detailed description when considered in connection with the accompanying drawings wherein.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Figure 1:
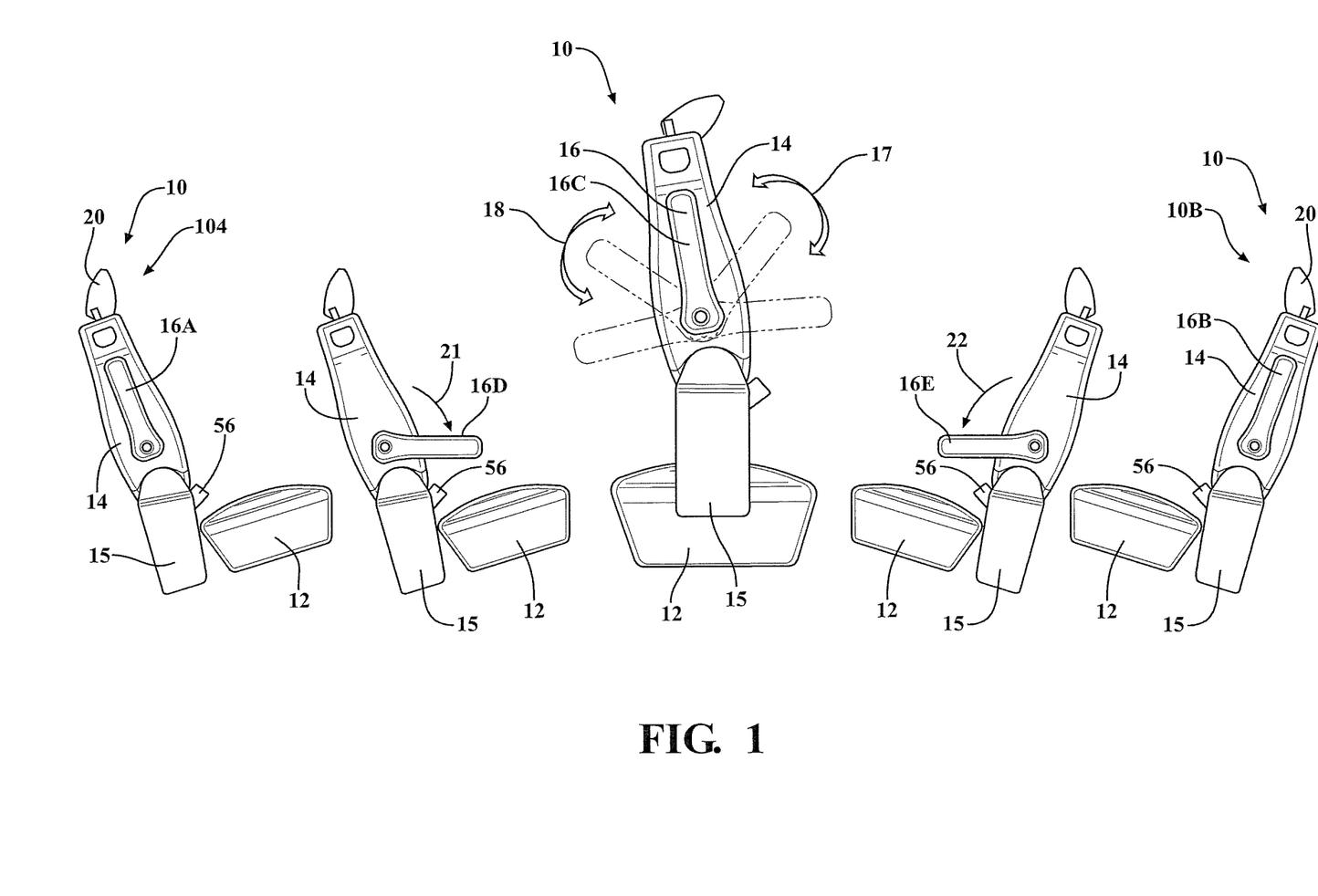
FIG. 1 is a diagrammatic side view illustrating a reversible seat moving between forward and rearward-facing positions with an armrest in deployed and stowed positions.

FIG. 1 illustrates a preferred embodiment of a reversible seat assembly 10 for use in an automotive vehicle, wherein the seat assembly is shown in multiple operative design positions. This reversible seat assembly 10 is reversibly movable both forwardly and rearwardly to change the direction in which an occupant faces.

Generally, the seat assembly 10 includes a seat cushion 12 and a seat back 14 operatively coupled together for supporting the occupant in a generally upright seating position. The seat cushion 12 is supported above a floor in the vehicle and operatively connected to the seat back 14 by a seat riser 15 on each side thereof. Although the figures and description below refer to one seat riser 15 on one side of the seat assembly 10, the present invention includes corresponding structures on the opposite side of the seat assembly 10, as is well known in the art.

The seat back 14 is pivotally coupled to the seat riser 15 so as to pivot or rotate in forward and rearward directions. Also, the seat cushion 12 is supported by the seat riser 15 so as to displace forwardly and rearwardly as is generally shown in FIG. 1, wherein such movement also changes the orientation or inclination of the seat cushion 12, which articulates as the seat assembly 10 moves forwardly and rearwardly between a forward-facing position 10A as shown on the left side of FIG. 1 and a rearward-facing position 10B as shown on the right side thereof. During this reversible movement, the seat assembly 10 travels through a neutral, intermediate position 10C shown in the center of FIG. 1. As can be seen in the various configurations shown in FIG. 1, the seat back 14 pivots while the seat cushion 16 articulates during the movement of the seat assembly 10 between the forward-facing position 10A and the rearward-facing position 10B so that the occupant can face in either direction.

It should be understood that the terms forward and rearward as used herein are used to differentiate the orientation of the seat assembly 10 as it moves through its range of travel and the direction in which the seat typically faces relative to the front and rear of a vehicle. However, it will be understood that such terms could simply refer to first and second directions, and this terminology are not intended to restrict the invention to the orientation of the seat assembly 10 when mounted in the vehicle.

The seat assembly 10 also includes an armrest 16, which preferably is rotatably supported by the seat back 14 for movement between an upright, stowed position and generally horizontal, deployed positions. It should be appreciated that the seat assembly 10 can include a single armrest 16, or a pair of left and right armrests 16. Each of the left and right armrests 16 are substantially mirror images of each other. Hence, for illustrative purposes, only one armrest 16 will be subsequently described.

More particularly as to the armrest movement, the armrest 16 is typically in a stowed position 16A, 16B or 16C in each of the seat positions 10A, 10B and 10C, and during much of the seat movement between these seat positions 10A, 10B and 10C. When the armrest 16 is in a stowed position, such as the illustrated stowed positions 16A, 16B or 16C, the armrest 16 is roughly vertical and extends upwardly alongside the seat back 14.

Referring to the seat position 10C at the center of FIG. 1, the seat assembly 10 and its seat back 14 are positioned in this neutral, intermediate position designated by reference numeral 10C and the armrest 16 is shown in the stowed position designated by reference numeral 16C. As diagrammatically shown in the center of FIG. 1, the armrest 16 is reversibly rotatable both forwardly (as indicated by reference arrow 17) to a first deployed position and rearwardly (as indicated by reference arrow 18) to a second deployed position. Preferably, this armrest rotation is performed manually by the occupant. When the armrest 16 is manually rotated either in direction 17 or 18 and deployed for use by an occupant, the armrest 16 is roughly horizontal and extends or projects either forwardly from the seat back 14 or rearwardly therefrom to support the arm weight of the occupant's body.

The seat assembly 10 also includes a headrest 20 which articulates forwardly and rearwardly during seat movement.

More particularly as to the inventive armrest 16, the armrest 16 is automatically stowable upon movement of the seat assembly 10 from either the forward-facing position 10A or rearward-facing position 10B. As noted above, the seat assembly 10 is reversibly movable between the forward-facing position 10A and the rearward-facing position 10B so that an occupant can sit and face in either direction. Typically, the seat assembly 10 may be provided in any vehicle but is particularly useful in multi-occupant vehicles to allow changing of the seating configuration.

When the seat assembly 10 is first stopped in the forward-facing position 10A or rearward-facing position 10B, the armrest 16 is in the upright stowed positions as indicated by 16A and 16B. The occupant may then rotate the armrest 16 downwardly to a fully deployed position wherein the armrest 16 may project forwardly in a first forwardly deployed position 16D (shown on the left side of FIG. 1) or rearwardly in a second deployed position 16E (shown on the right side of FIG. 1) depending upon whether the seat is in the forward-facing position 10A or rearward-facing position 10B. The armrest 16 may be deployed to either of these fully deployed positions 16D or 16E by the manual pivoting of the armrest 16 downwardly in either forward or rearward directions 21 or 22 away from the stowed armrest positions 16A or 16B.

As will be described further below, the armrest 16 will be automatically locked in either of the deployed positions 16D or 16E simply by manual movement of the armrest 16 downwardly from the stowed positions 16A and 16B. However, the armrest 16 is also releasable from these deployed positions 16D or 16E and automatically returns to the intermediate stowed position 16C as the seat assembly 10 leaves the facing positions 10A or 10B and is moved through the intermediate seat position 10C.

Figure 2:
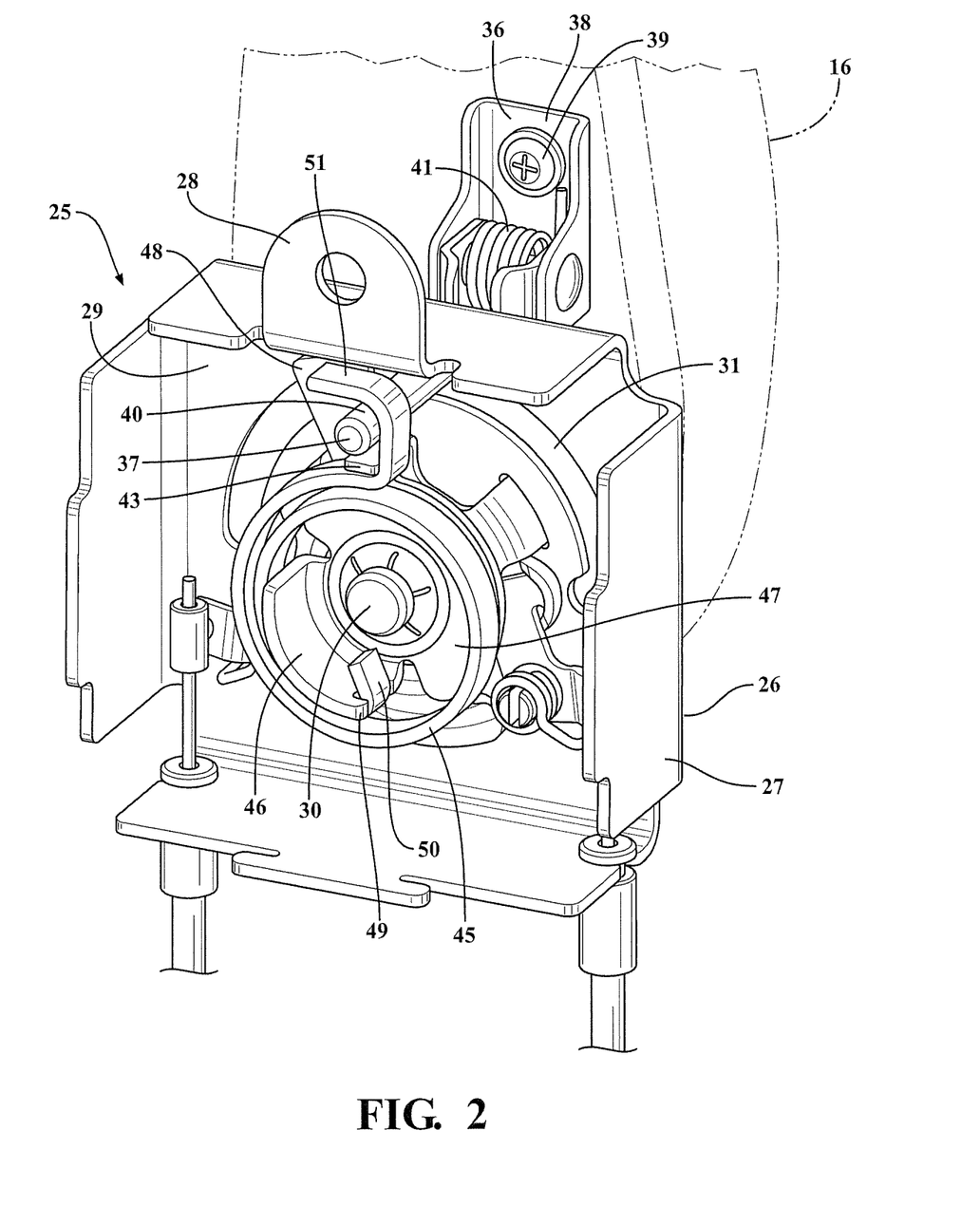
FIG. 2 is perspective view of a control mechanism for the armrest.
Figure 3:
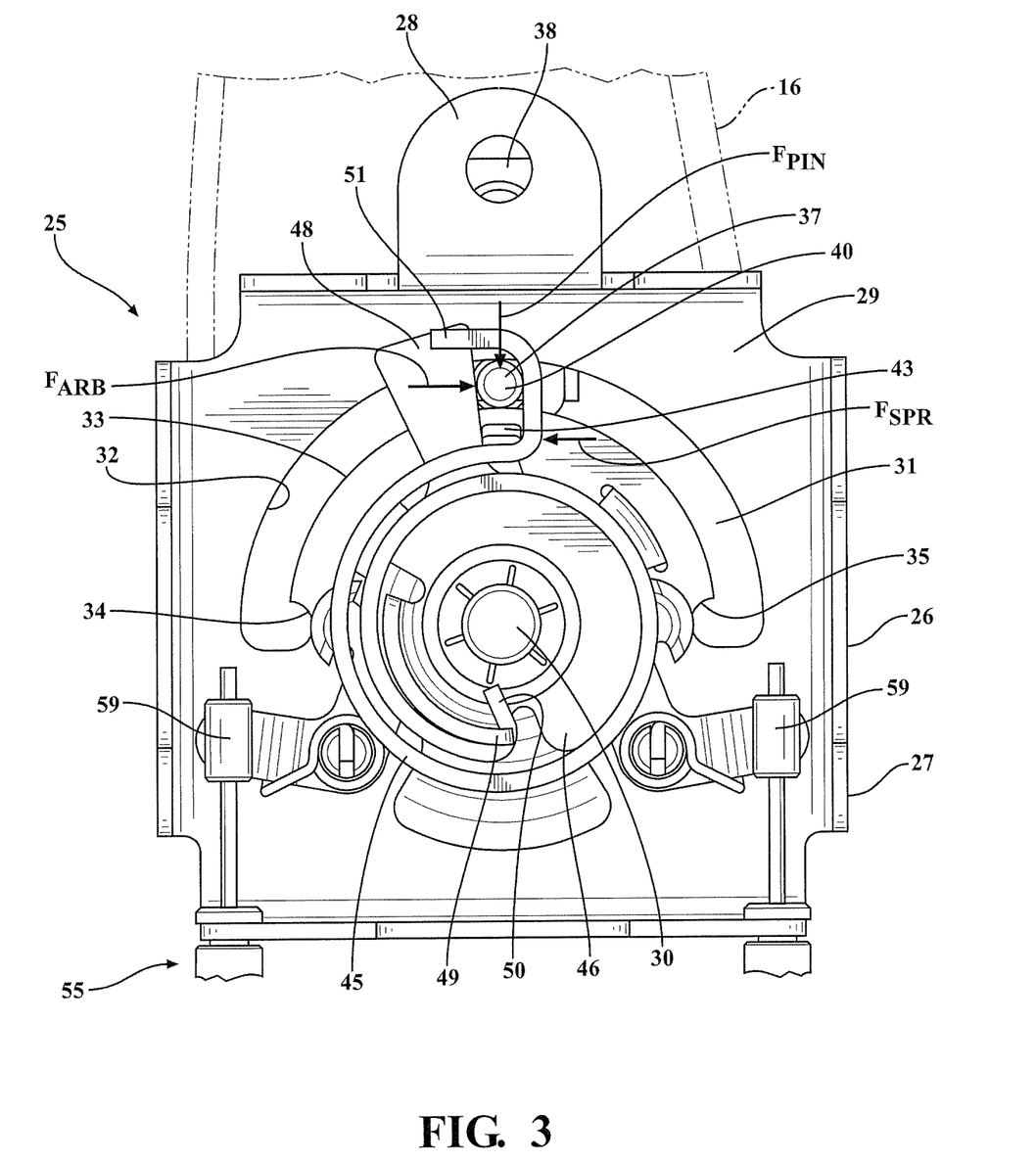
FIG. 3 is a side view of the control mechanism with the armrest in the stowed position.

Referring in more detail to FIGS. 1-3, the invention relates to an armrest 16 having an improved armrest support assembly which comprises a pivot mechanism or control mechanism 25 for rotatably supporting the armrest 16 and governing the automatic return of the armrest 16 to the stowed position 10C upon reversing movement of the seat assembly 10. In FIGS. 2 and 3, the armrest 16 is shown in a stowed configuration corresponding to any of the stowed positions 16A, 16B or 16C of FIG. 1. The armrest 16 is rotatably coupled to a base bracket or support bracket 26 located within the seat assembly 10, and preferably on the seat back 14, wherein the armrest 16 is rotatably supported by the base bracket 26 and moves with the seat back 14 as it moves forwardly or rearwardly away from the neutral seat position 10C.

The base bracket 26 has a box-like configuration which includes side walls 27 and a mounting flange 28 that are securely fixed to the frame structure of the seat assembly 10. The side walls 27 project from a main bracket wall or body 29 which faces toward an interior surface of the armrest 16. The box-like configuration of the base bracket 26 provides structural support and also covers the various components of the pivot mechanism 25.

To rotatably support the armrest 16, the bracket wall 29 includes a pivot shaft 30 that rotatably connects to the armrest 16 to define a sideward-extending pivot axis about which the armrest 16 rotates relative to the seat back 14. The pivot shaft 30 supports the weight of the armrest 16 and allows the armrest 16 to reversibly rotate in the directions indicated by reference arrows 17 and 18 in FIG. 1.

The bracket wall 29 also includes an arcuate travel slot 31 which extends along an arcuate path of approximately 180 degrees and opens sidewardly toward the interior surface of the armrest 16. The travel slot 31 is defined by radially spaced, arcuate slot edges 32 and 33, wherein the terminal ends of the travel slot 31 include locking formations preferably formed as notched detents 34 and 35 in one of the slot edges 32 and 33. Preferably, the detents 34 and 35 are formed in the inner slot edge 33.

The pivot mechanism 25 of the seat assembly 10 also includes a lock assembly 36 which is carried by the armrest 16 and rotates therewith. The lock assembly 36 operatively cooperates with the travel slot 31 and selectively engages the detents 34 and 35 to lock the armrest in either of the forwardly or rearwardly deployed positions 16D or 16E. The lock assembly 36 includes a spring loaded lock pin 37 originating from the armrest structure 16, which extends sidewardly into and through the travel slot 31 within the base bracket 26 as seen in FIGS. 2 and 3. During reversible armrest rotation, the lock pin 37 travels along the length of the travel slot 31 between the detents 34 and 35.

To facilitate engagement of the lock pin 37 with the detents 34 and 35, the lock pin 37 is pivotally connected to a support flange 38, wherein the support flange 38 is fastened to the armrest 16 by a fastener 39. The lock pin 37 is pivotal vertically about a pivot axis that extends in the front-to-back direction, and has a free pin end 40 that projects sidewardly into and through the travel slot 31. The lock assembly 36 also includes a biasing member 41 formed as a coil spring which normally biases the lock pin 37 downwardly or radially inwardly toward the pivot pin 30 so that the lock pin 37 is biased or forced against the slot edge 33. Other than the ability to pivot, the lock pin 37 is rigidly held by the support flange 38 to support weight applied to the deployed armrest as discussed below.

During armrest rotation, the lock pin 37 is carried by the armrest 16 and travels along the travel slot 31, and is biased transversely against one slot edge 33 to allow manual rotation of the armrest 16 between the forwardly and rearwardly deployed positions 16D and 16E. As the lock pin 37 reaches or bottoms out at one end of the travel slot 31 or the other, the pin biasing force ($F_{PIN}$) will bias or pivot the lock pin 37 into the detents 34 or 35 when aligned therewith at the opposite ends of the travel slot 31. When this occurs, the lock pin 37 acts to stop armrest rotation and also lock the armrest 16 in the deployed position 16A or 16B as described further herein. When the lock pin 37 bottoms out at either end of the travel slot 31, the rigidity of the lock pin 37 thereby carries the weight of the armrest 16, and the locking of the lock pin 37 with one detent 34 or 35 holds the armrest 16 in the deployed condition. The detents 34 and 35 thereby define first and second locking positions for the lock pin 37.

However, when the lock pin 37 is unlocked or released from the detents 34 and 35, the armrest 16 is normally biased and automatically returns to the neutral stowed position as described further below. To provide this functionality, the base bracket 25 includes an arrester tab 43 that is stationarily fixed to and projects sidewardly from the bracket wall 29 at about the midpoint of the travel slot 31. The arrester tab 43 is located radially inwardly of the inner slot edge 33 and is generally aligned with the lock pin 37 when the armrest 16 is in the stowed position as shown in FIGS. 2 and 3. The location of the arrester tab 43 generally defines the location at which the armrest 16 will stop when in a neutral, stowed position. Preferably, the armrest 16 is stowed lengthwise in alignment with the side edge of the seat back 14.

As shown in FIG. 3, in the neutral, stowed position, the lock pin 37 is held in place by the opposing forces of a coiled return spring 45 and a rotating arbor plate 46, which are both balanced against the fixed arrester tab 43 to generate return spring and arbor forces ($F_{SPR}$ & $F_{ARB}$) that act in opposite directions to normally bias the armrest 16 toward the neutral, stowed position. In this neutral position, the lock pin 37 is forced against the slot edge 33 by the radial pin force ($F_{PIN}$), while the return spring and arbor forces ($F_{SPR}$ & $F_{ARB}$) are balanced against the fixed arrester tab 43 as well as the lock pin 37.

The arbor plate 46 includes a main body 47 that is pivotally supported by the pivot pin 30 and defines a radial arbor flange 48, which projects radially outwardly over the travel slot 31 and normally abuts against one side of the lock pin 37 when in the neutral position of FIG. 3. One edge portion of the arbor plate 46 also includes a spring catch 49, which is notched to engage an inner spring end or inner arm 50 of the return spring 45.

The return spring 45 is preferably formed as a coil spring that has the inner spring end or inner atm 50 formed as a hook that hooks onto the spring catch 49 of the arbor plate 46. The outer spring end or outer arm 51 of return spring 45 is also formed with a bent, hook-like configuration. In the neutral position of FIG. 3, the outer arm 51 can abut on one side against both of the arrester tab 43 and the lock pin 37. In this neutral position, the return spring 45 is in tension so that the outer arm 51 engages and applies a sideward biasing force against the one side of the arrester tab 43 and lock pin 37, while the inner arm 50 applies a sideward biasing force against the spring catch 49 of the arbor plate 46 to rotate the arbor flange 48 counterclockwise against the opposite side of the arrester tab 43 and lock pin 37. In this manner, the lock pin 37 undergoes a biasing force applied on both sides by the opposing return spring and arbor forces ($F_{SPR}$ & $F_{ARB}$). These biasing forces normally bias the armrest 16 to the neutral stowed position regardless of whether the armrest 16 has been rotated forwardly or rearwardly away from this neutral position. At the same time, this spring configuration allows rotation of the armrest 16 in either direction.

Figure 4:
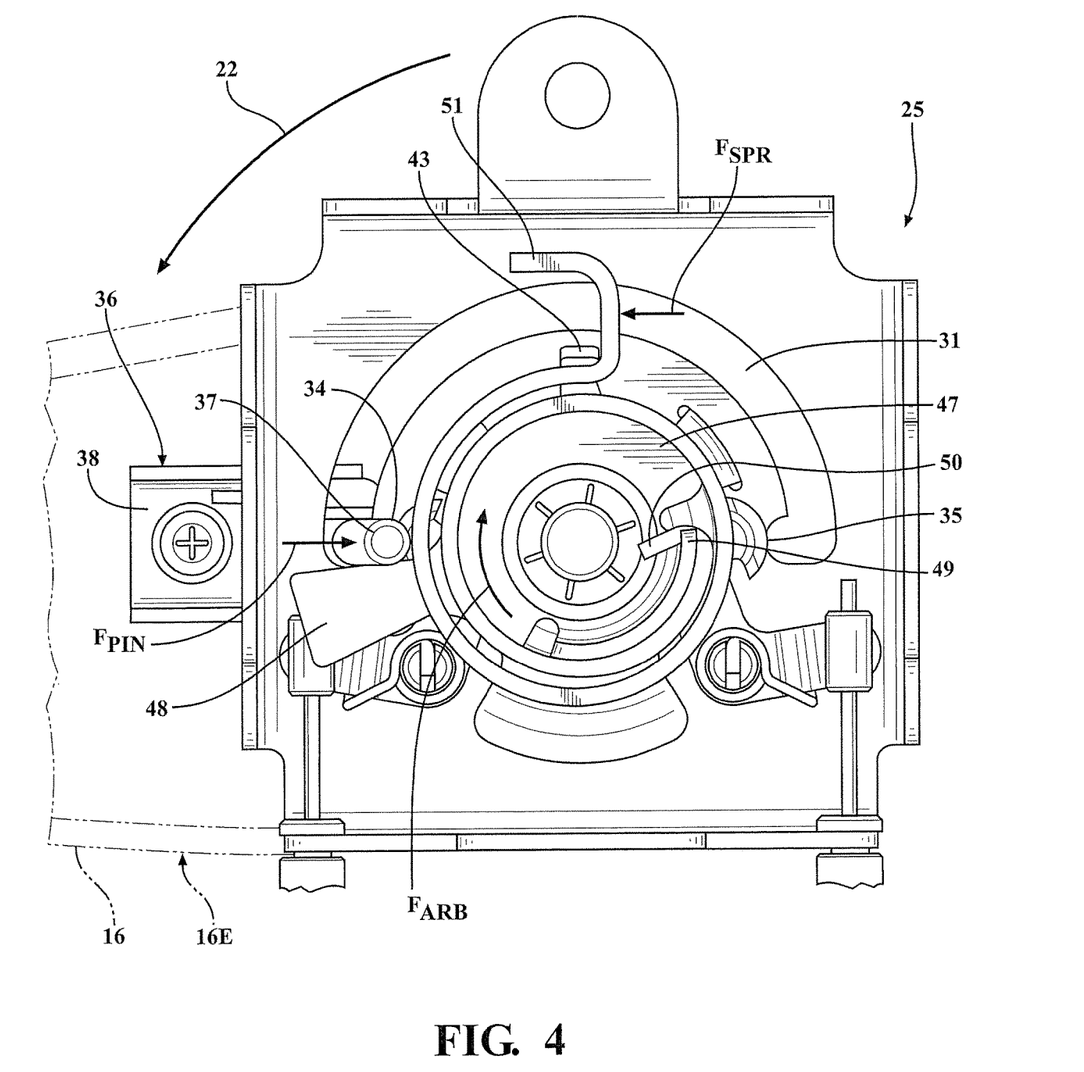
FIG. 4 is a side view of the control mechanism with the armrest in a first deployed position.

Referring more particularly to armrest movement shown in FIG. 4, when the seat assembly 10 is moved to the rearward-facing position 10B, the armrest 16 can be manually deployed to deployed position 16E, wherein the lock pin 37 contacts the arbor flange 48, and rotation of the armrest 16 drives the lock pin 37 along the travel slot 31 to thereby rotate the arbor plate 46 counterclockwise in a first rotation direction. The lock pin 37 moves in a corresponding first slot direction along the travel slot 31 and rotates the arbor plate 46 (counterclockwise in FIG. 4), which winds the return spring 45 from the inside since the arbor spring catch 49 also rotates counterclockwise to circumferentially move the inner arm 50 of the return spring 45. This spring tensioning by the arbor plate 46 exerts a return force $F_{ARB}$ biasing the lock pin 37 and connected armrest 16 in a second slot direction back toward the neutral, stowed position.

As the arbor plate 46 is rotated and the inner spring arm 50 is displaced by the arbor plate 46, the outer arm 51 of the return spring 45 is held stationary against the fixed arrester tab 43 of the spring base bracket 26. The outer spring arm applies a spring force $F_{SPR}$ to the fixed arrester tab 43 but allows the return spring 45 to be wound from the inside upon the lock pin's contact with the rotating flange 48. At the fully deployed position of FIG. 4, the lock pin 37 is forced by the radial pin force $F_{PIN}$ into the detent 34 in the travel slot 31 to lock the armrest 16 in the rearwardly deployed position 16E and prevent the armrest 16 from rotating and returning to the stowed position 16B. While the armrest 16 is locked in this position 16E, the arbor force $F_{ARB}$ continues to exert a clockwise return force on the lock pin 37 which still contacts the arbor flange 48 so that when the lock pin 37 is unlocked or released from the detent 34, the armrest 16 can automatically move back to the stowed position 16B.

Figure 5:
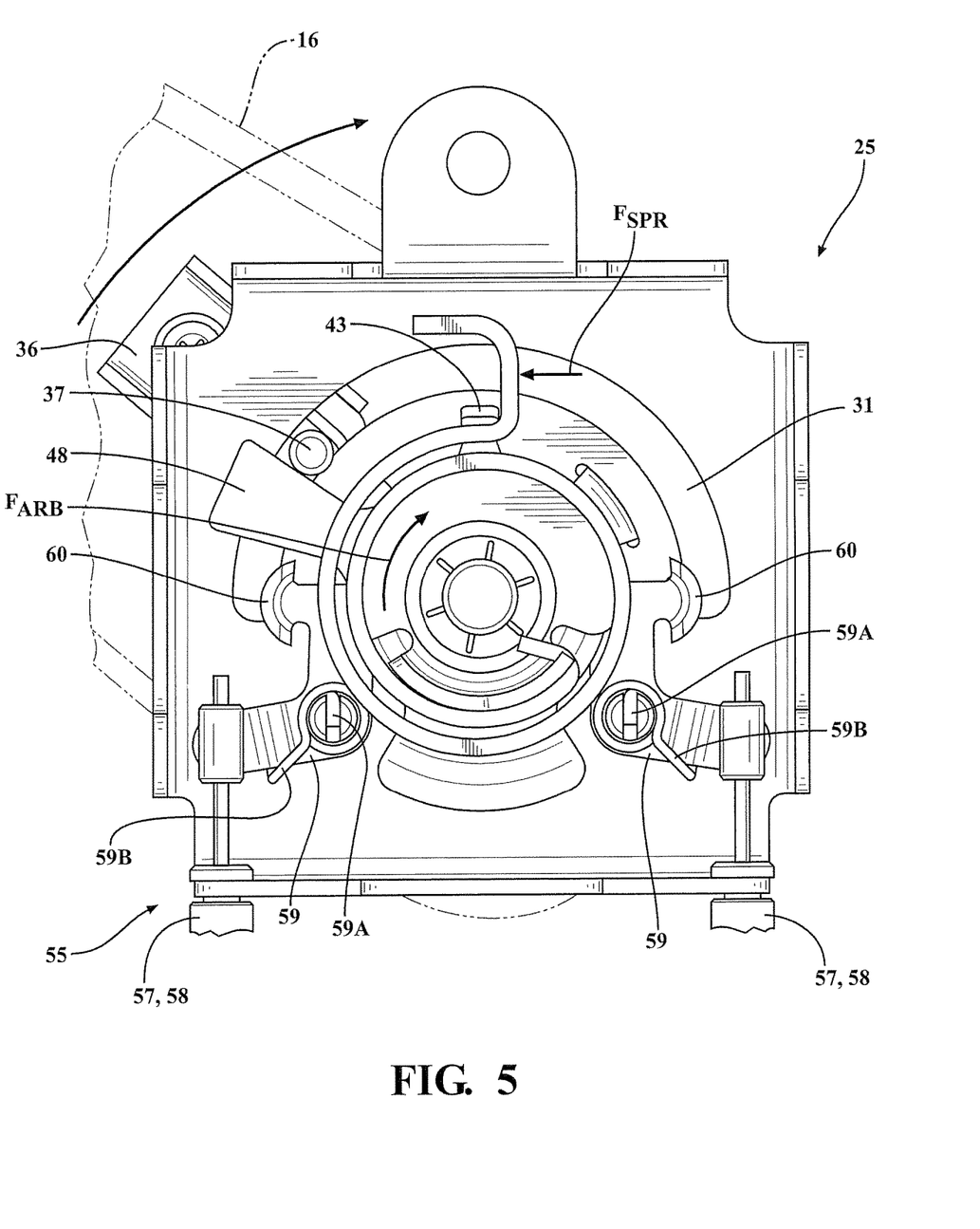
FIG. 5 is a side view of the control mechanism with the armrest returning to a stowed position.
Figure 6:
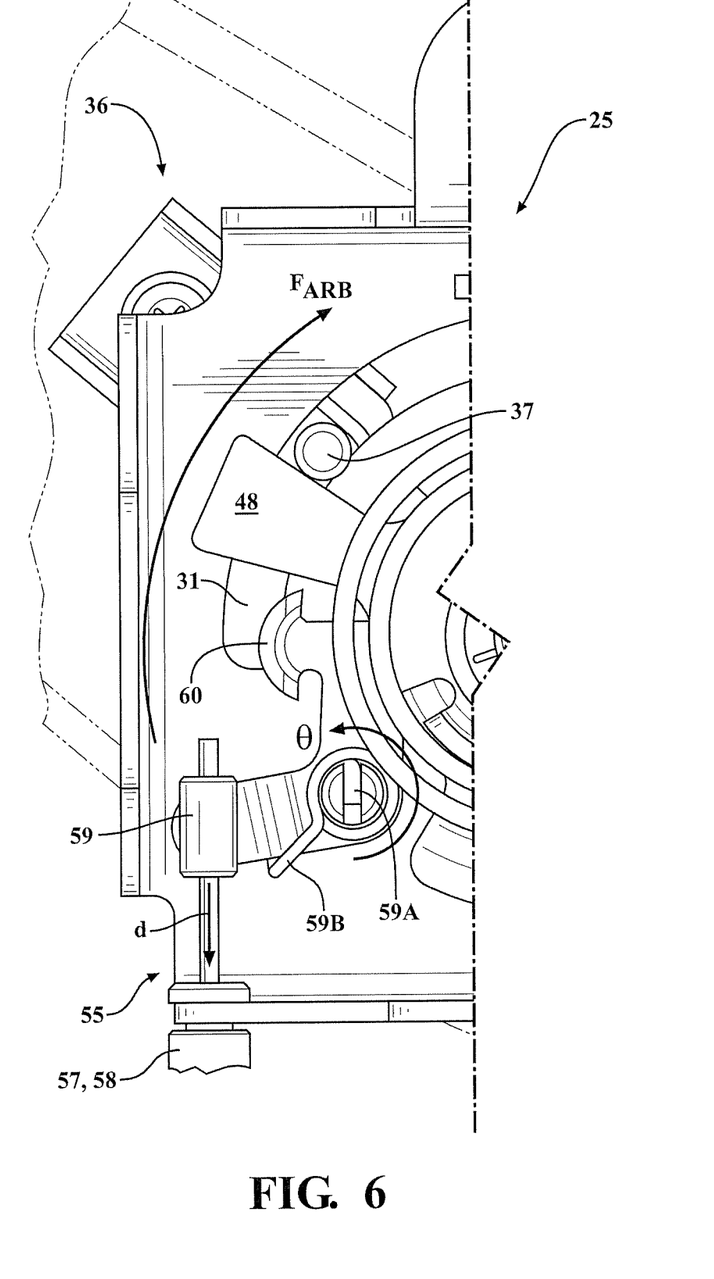
FIG. 6 is an enlarged partial side view of the control mechanism of FIG. 5 with a lock release mechanism in an actuated condition.

Referring to FIGS. 5 and 6, to automatically return the armrest 16 to the neutral, stowed position, a lock release mechanism 55 is provided that operatively engages with the lock pin 37 to disengage the lock pin 37 from either detent 34 or 35. In this regard, an actuation release handle or strap 56 (FIG. 1) may be provided as part of the seat assembly 10. The release handle 56 may also be operable to simultaneously release and unlock the seat assembly 10 to permit movement of the seat assembly 10 between the forward-facing and rearward-facing positions 10A and 10B. The release handle 56 preferably operates and displaces actuator members 57, which preferably are formed as a pair of cables 58 that are pulled simultaneously by the release handle 56.

The lock release mechanism 55 further includes a pair of lock release links 59, which are pivotally supported on the base bracket 26 and are disposed adjacent to the respective detents 34 and 35. When the release handle 56 is pulled, this causes a downward stroke of the two cables 58, which are in turn coupled to the pair of lock release links 59 located on the base bracket 26. As shown in FIG. 6, the downward stroke (d) of the cables 58 rotates the lock release links 59 at a respective link pivot 59A containing a return spring 59B. As such, the cable stroke (d) rotates the lock release links to an activated position. Upon release of the release handle 56, the return spring 59B returns to the lock release links 59 back to a deactivated position.

Each lock release link 59 includes a release head or arm 60, which is movable radially into contact with the lock pin 37 in the region of the respective detent 34 or 35. In FIGS. 5 and 6, the head 60 thereby forces the lock pin 37 radially out of the detent 34 which releases the locking action of the lock pin 37 when seated in the detent 34. The force $F_{ARB}$ of the rotating flange 48, motivated by the uncoiling return spring 45, pushes the lock pin 37 back along the travel slot 31 in the clockwise direction as seen in FIGS. 5 and 6 and then back to the neutral stowed position of FIG. 3. When the lock pin 37 and armrest 16 reaches the stowed position of FIG. 3, the arbor flange 48 again abuts against the fixed arrester tab 43 which thereby biases the armrest 16 to the stowed position automatically and then holds the armrest 16 in this stowed position as the seat assembly 10 moves through the intermediate seat position 10C (FIG. 1).

Figure 7:
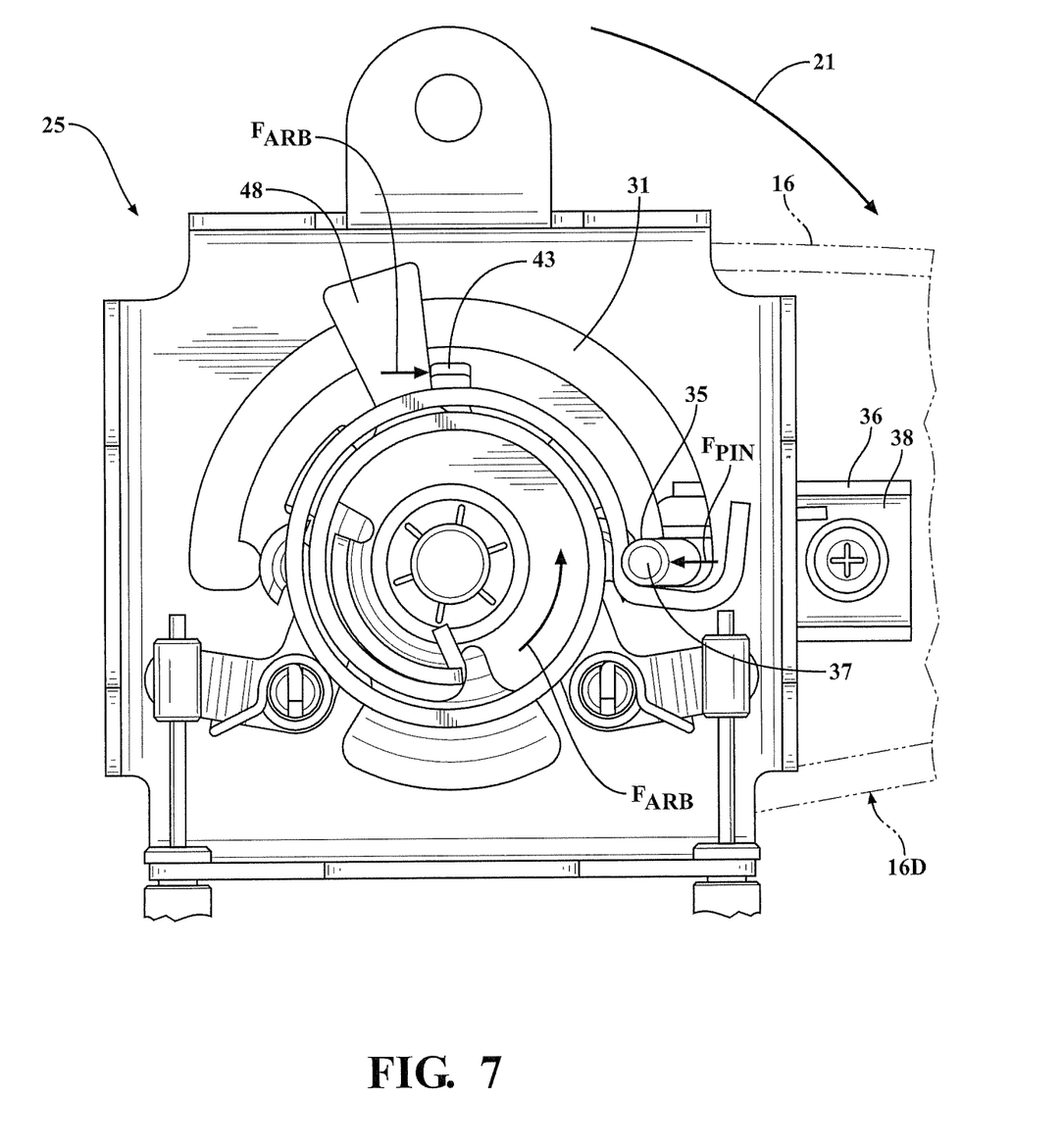
FIG. 7 is a side view of the control mechanism with the armrest in a second deployed position.

Next as to FIG. 7, when the seat assembly 10 is moved to the forward-facing position 10A and the armrest 16 is manually deployed forwardly to the deployed position 16D, the lock pin 37 contacts the outer spring arm 51, wherein rotation of the armrest 16 drives the lock pin 37 clockwise in the second slot direction along the travel slot 31 thereby driving the outer spring arm 51 therewith. The arbor flange 48 abuts against the arrester tab 43 which prevents rotation of the arbor plate 46 and holds the inner spring arm 50 in place. As such, the lock pin 37 moves in the second direction along the travel slot 31 and winds the return spring 45 from the outside around the arbor plate 46 since the arbor spring catch 49 and inner arm 50 of the return spring 45 remain stationary.

This spring tensioning by the return spring 45 and lock pin 37 exerts a spring return force $F_{SPR}$ which biases the lock pin 37 and connected armrest 16 back toward the neutral, stowed position. Once the lock pin 37 reaches the end of the travel slot 31 and is stopped thereby, the lock pin 37 is forced radially inwardly into the detent 35 by the radial pin force $F_{PIN}$. Therefore, at the fully deployed position of FIG. 7, the lock pin 37 is forced radially inward by the pin force $F_{PIN}$ into the detent 35 to prevent the armrest 16 from rotating and returning to the stowed position 16A and thereby lock the armrest 16 in the forwardly deployed position 16D. While the armrest is locked in this position, the spring force $F_{SPR}$ continues to exert a return force directly on the lock pin 37 so that when the lock pin 37 is unlocked or released from the detent 35, the armrest 16 can automatically move counterclockwise along the travel slot 31 back to the stowed position.

Figure 8:
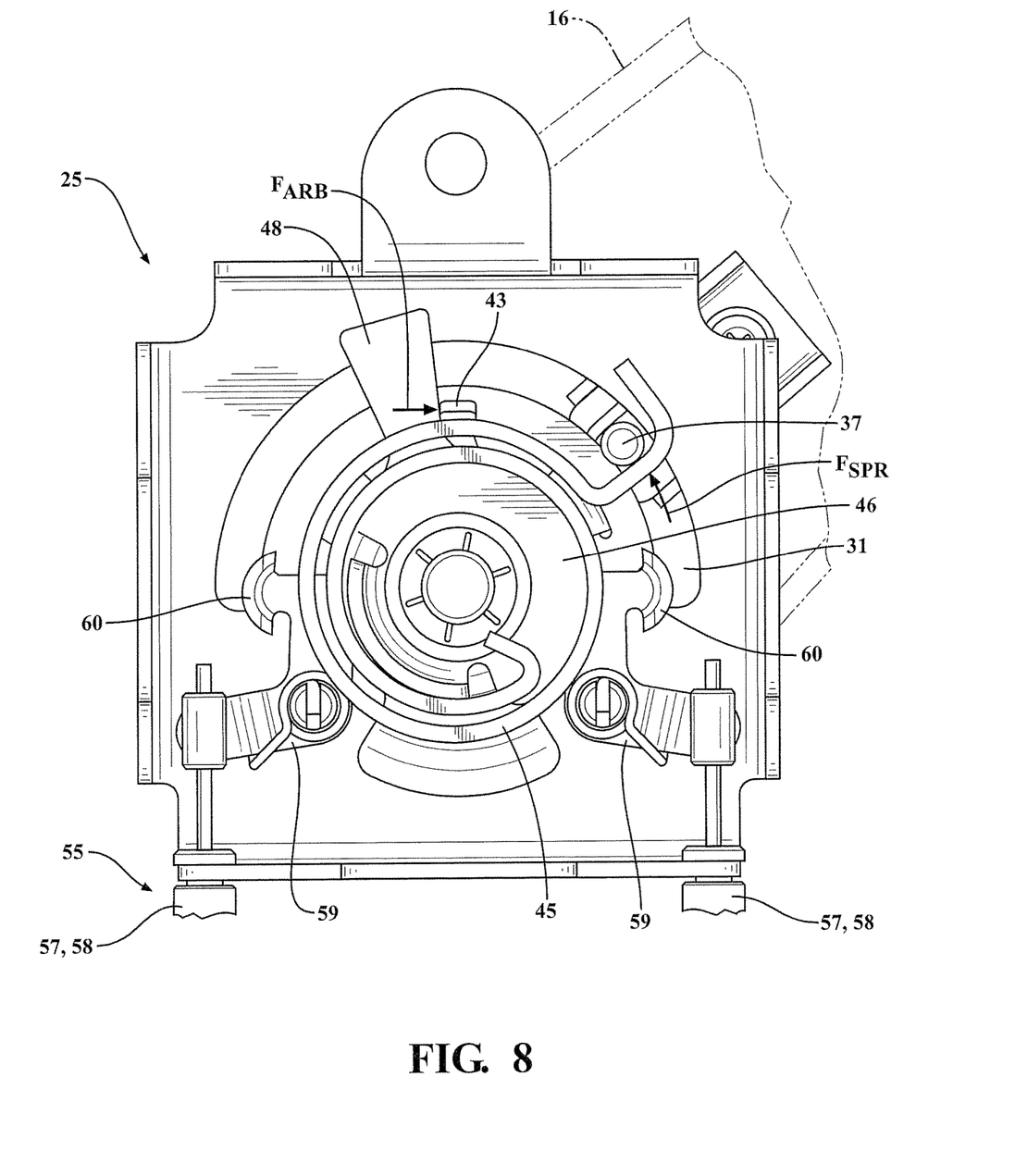
FIG. 8 is a side view of the control mechanism with the armrest returning to a stowed position.
Figure 9:
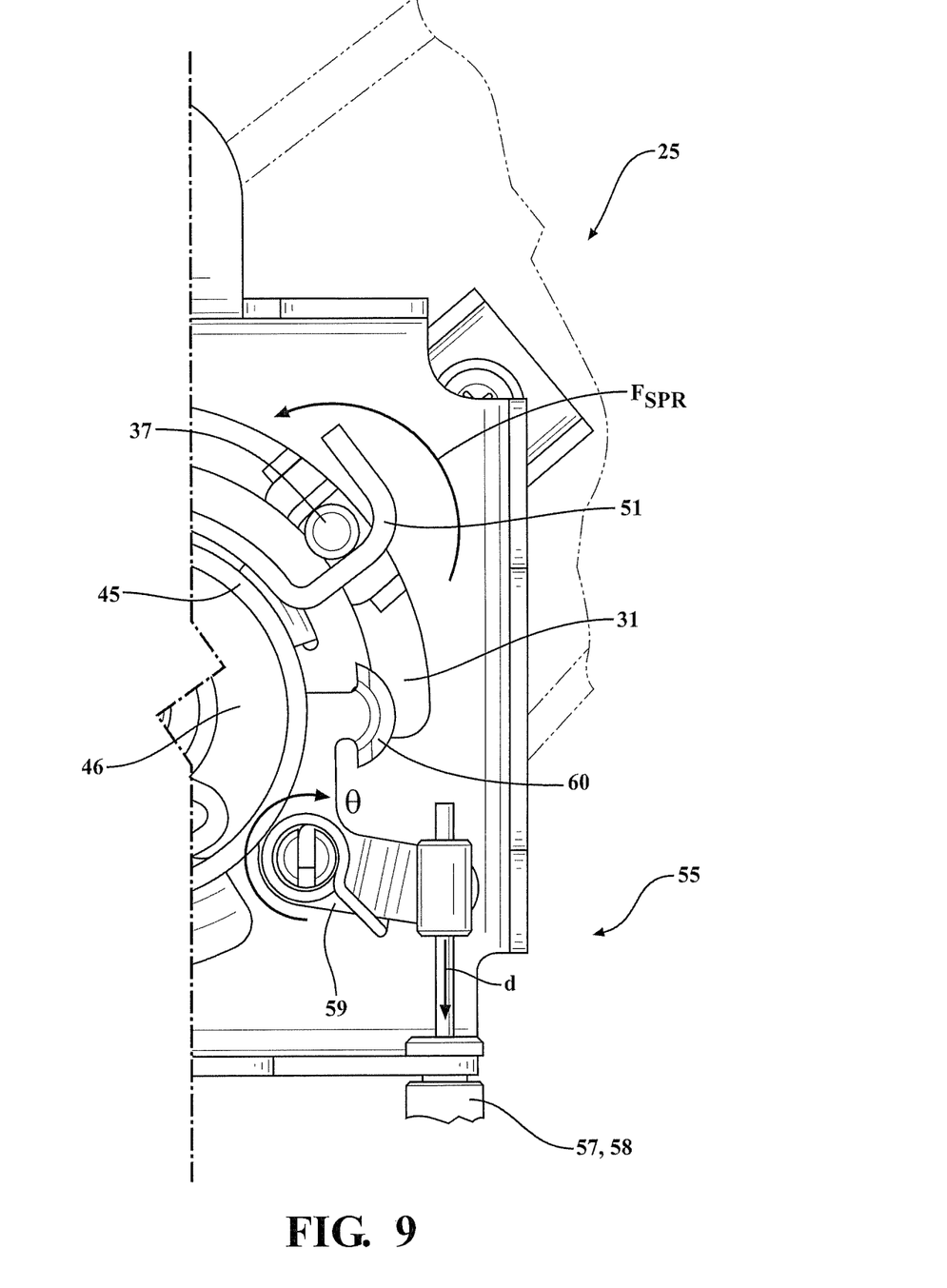
FIG. 9 is an enlarged partial side view of the control mechanism of FIG. 8 with a lock release mechanism in an actuated condition.

Referring to FIGS. 8 and 9, the lock release mechanism 55 similarly is utilized when the seat assembly 10 is in the forward-facing position 10A and the armrest 16 is manually deployed to deployed position 16D of FIG. 7. The armrest 16 is again held in the fully deployed position 16D by the other detent 35 in the base bracket travel slot 31 which is engaged by the lock pin 37. And similarly, when the actuation release handle or strap 56 is pulled, the lock pin 37 is forced out of the second detent 35 by the lock release links 59 as shown in FIGS. 8 and 9. Here again, the cable stroke (d) rotates the lock release links 59 to an activated position. Upon release of the release handle 56, the return springs 59B return the lock release links 59 back to a deactivated position.

As described above, when the release handle 56 is pulled, this causes a downward stroke (d) of the two cables 58, which are in turn coupled to the pair of lock release links 59 located on the base bracket 26. The downward stroke (d) of the cables 58 rotates the lock release links 59 at a respective link pivot 59A. Preferably, when two armrests 16 are provided, the release handle 56 operates both lock release mechanisms 55 to allow both armrests 16 to automatically return to their respective stowed positions.

In more detail as to FIGS. 8 and 9, the head 60 is movable radially into contact with the lock pin 37 in the region of the respective detent 35, and thereby forces or pushes the lock pin 37 radially out of the detent 35 which releases the locking action of the lock pin 37 and detent 35. The spring force ($F_{SPR}$) exerted by the uncoiling return spring 45, then pushes the lock pin 37 counterclockwise back along the travel slot 31 as seen in FIGS. 8 and 9 and then back to the neutral position of FIG. 3, wherein the lock pin 37 again abuts against the arbor flange 48 which thereby biases the armrest 16 to the stowed position automatically and then holds the armrest 16 in this stowed position as the seat assembly 10 moves through the intermediate seat position 10C (FIG. 1) to the other facing position.

With this configuration, an improved armrest 16 is provided which allows the armrest 16 to be manually moved to a deployed position 16D or 16E and locked in position to carry the weight of the occupant's arm. The lock release mechanism preferably is actuated simultaneously with the seat release mechanism to allow movement of the seat assembly 10 and automatically returned to the stowed position 16C upon this release of the lock mechanism. During seat movement, the armrest 16 is then automatically positioned in the stowed position so as to be ready for manual deployment by the occupant once seat movement is completed.

While the pivot mechanism 25 and armrest 16 are illustrated in one orientation in the figures on one side of the seat assembly 10, the same pivot mechanism 25 can be used on the opposite side of the seat assembly 10. On the opposite side, the winding of the return spring 45 would be similar but the lock pin 37 would travel in the other slot direction. For example, as the lock pin 37 travels clockwise as shown in FIG. 4 to actuate the inner spring arm 50 on this one seat side, the lock pin 37 would travel counterclockwise on the opposite seat side as generally shown in FIG. 7 to displace the outer spring arm 51. On both sides, the return springs 45 would still automatically return both armrests 16 to the stowed positions upon simultaneous release by the lock release mechanisms 55.

Although a particular preferred embodiment of the invention has been disclosed in detail for illustrative purposes, it will be recognized that variations or modifications of the disclosed apparatus, including the rearrangement of parts, lie within the scope of the present invention.

What is claimed:

1. An automatic stowing armrest for a reversible seat assembly which is movable between a forward-facing position and a rearward-facing position, said armrest comprising:
   a pivot mechanism comprising a base bracket and a pivot pin defining a pivot connection rotatably supporting said armrest on said base bracket such that said armrest is movable in opposite first and second directions between a first deployed position and a second deployed position, said armrest being rotatable to a stowed position intermediate said first deployed position and said second deployed position;
   a lock assembly supported on said armrest so as to be movable with said armrest, said lock assembly including a lock pin projecting into engagement with said base bracket and movable with said armrest from a first locked position and a second locked position in which said lock pin lockingly engages said base bracket to releasably lock said armrest in either of said first and second deployed positions;
   a biasing assembly defining opposing first and second biasing forces acting on said lock pin to respectively bias said lock pin away from said first locked position and said second locked position to automatically bias and return said armrest to said stowed position; and
   a lock release mechanism which is actuatable to unlock said lock pin from said base bracket and permit automatic return of said armrest to said stowed position during seat movement.

2. The automatic stowing armrest according to claim 1, wherein said armrest is manually pivotable from said stowed position to said first and second deployed positions.

3. The automatic stowing armrest according to claim 1, wherein said first and second directions are oriented forwardly and rearwardly relative to a facing direction of a seat assembly to which said armrest is mountable, and said first and second deployed positions extend forwardly and rearwardly and said stowed position extends vertically relative thereto.

4. The automatic stowing armrest according to claim 1, wherein said base bracket includes a travel slot having opposite slot ends and said lock pin extends into said travel slot and travels between said slot ends during rotation of said armrest.

5. The automatic stowing armrest according to claim 4, wherein said opposite slot ends define said first and second locked positions, said lock pin being lockingly engagable with locking formations at said opposite slot ends to define said first and second locked positions.

6. The automatic stowing armrest according to claim 5, wherein said travel slot comprises a slot edge which includes first and second detents at said first and second locked positions which define said locking formations and are releasably engagable with said lock pin to selectively lock said armrest.

7. The automatic stowing armrest according to claim 6, wherein said lock pin is spring biased as to be forced radially against said slot edge as said lock pin moves along said travel slot.

8. The automatic stowing armrest according to claim 1, wherein said biasing assembly comprises a rotatable arbor plate and a return spring, said arbor plate having an arbor flange releasably engaged with a first side of said lock pin, and said return spring having a first spring arm engaged with said arbor plate and a second spring arm releasably engaged with a second side of said lock pin opposite said first side of said lock pin, said arbor flange and said second spring arm defining said opposing first and second biasing forces acting on said lock pin which both act on said lock pin in said stowed position wherein only one of said first and second biasing forces acts on said lock pin when displaced to said first and second locked position.

9. The automatic stowing armrest according to claim 8, wherein said lock pin is movable out of engagement with said arbor flange when displaced to said second locked position such that said second spring arm continues to apply said second biasing force, and is movable out of engagement with said second spring arm when displaced to said first locked position such that said arbor flange continues to apply said first biasing force.

10. The automatic stowing armrest according to claim 9, wherein a fixed arrester tab is provided which holds either or both of said arbor flange and said second spring arm in a neutral position as said lock pin moves away from said arbor flange toward said first and second locked positions.

11. An armrest support mechanism for an armrest of a reversible seat assembly movable between a forward-facing position and a rearward-facing position, said armrest support mechanism comprising:
a pivot mechanism comprising a base bracket and a pivot pin defining a pivot connection for rotatable engagement with said armrest to permit movement of said armrest in opposite first and second directions between a first deployed position and a second deployed position, and permit movement to a stowed position intermediate said first deployed position and said second deployed position;
a lock assembly which is mountable on said armrest so as to be movable with said armrest, said lock assembly including a lock pin projecting into engagement with said base bracket and movable with said armrest from a first locked position and a second locked position in which said lock pin lockingly engages said base bracket to releasably lock said armrest in either of said first and second deployed positions;
a biasing assembly defining opposing first and second biasing forces acting on said lock pin to respectively bias said lock pin away from said first locked position and said second locked position to automatically bias and return said armrest to said stowed position, said first and second biasing forces acting on said lock pin together to hold said lock pin in a neutral position corresponding to said stowed position, with only one or the other of said first and second biasing forces acting on said lock pin as it travels away from said neutral position to said first or second locked positions; and
a lock release mechanism which is actuatable to unlock said lock pin from said base bracket and permit automatic return of said lock pin to said neutral position corresponding to stowed position of said armrest.

12. The armrest support mechanism according to claim 11, wherein said base bracket includes a travel slot having opposite slot ends and said lock pin extends into said travel slot and travels between said slot ends during armrest rotation.

13. The armrest support mechanism according to claim 12, wherein said lock pin being lockingly engagable with locking formations at said opposite slot ends to define said first and second locked positions.

14. The armrest support mechanism according to claim 13, wherein said travel slot comprises a slot edge which includes first and second detents at said first and second locked positions which define said locking formations and are releasably engagable with said lock pin to selectively restrain movement of said lock pin.

15. The armrest support mechanism according to claim 14, wherein said lock pin is spring biased so as to be forced radially against said slot edge as said lock pin moves along said travel slot.

16. The armrest support mechanism according to claim 11, wherein said biasing assembly comprises a rotatable arbor plate and a return spring, said arbor plate having an arbor flange releasably engaged with a first side of said lock pin, and said return spring having a first spring arm engaged with said arbor plate and a second spring arm releasably engaged with a second side of said lock pin opposite said first side of said lock pin, said arbor flange and said second spring arm defining said opposing first and second biasing forces acting on said lock pin which both act on said lock pin in said neutral position and only one of said first and second biasing forces acts on said lock pin when displaced to said first and second locked position.

17. The armrest support mechanism according to claim 16, wherein said lock pin is movable out of engagement with said arbor flange when displaced to said second locked position such that said second spring arm continues to apply said second biasing force, and is movable out of engagement with said second spring arm when displaced to said first locked position such that said arbor flange continues to apply said first biasing force.

18. The armrest support mechanism according to claim 17, wherein a fixed arrester tab is provided which holds either or both of said arbor flange and said second spring arm in said neutral position as said lock pin moves away from flange toward said first and second locked positions.

19. The armrest support mechanism according to claim 11, wherein said biasing assembly comprises a rotatable arbor plate and a return spring having first and second spring arms which are displaceable relative to each other to wind and unwind said return spring, said arbor plate having an arbor flange releasably engaged with a first side of said lock pin, and said first spring arm engaged with said arbor plate and said second spring arm releasably engaged with a second side of said lock pin opposite said first side of said lock pin when in said neutral position, said arbor flange and said second spring arm being displaceable by said lock pin as said lock pin moves away from said neutral position to wind said return spring.

20. The armrest support mechanism according to claim 19, wherein a fixed arrester tab is provided which defines said neutral position and holds both of said arbor flange and said second spring arm in said neutral position and hold only one when said lock pin moves away from said arbor flange toward one or the other of said first and second locked positions.

* * * * *